Oct. 28, 1941.　　　　E. S. KILLIAN　　　　2,260,854
DIPPING AND DISTRIBUTING APPARATUS
Filed Nov. 18, 1939　　　3 Sheets-Sheet 1
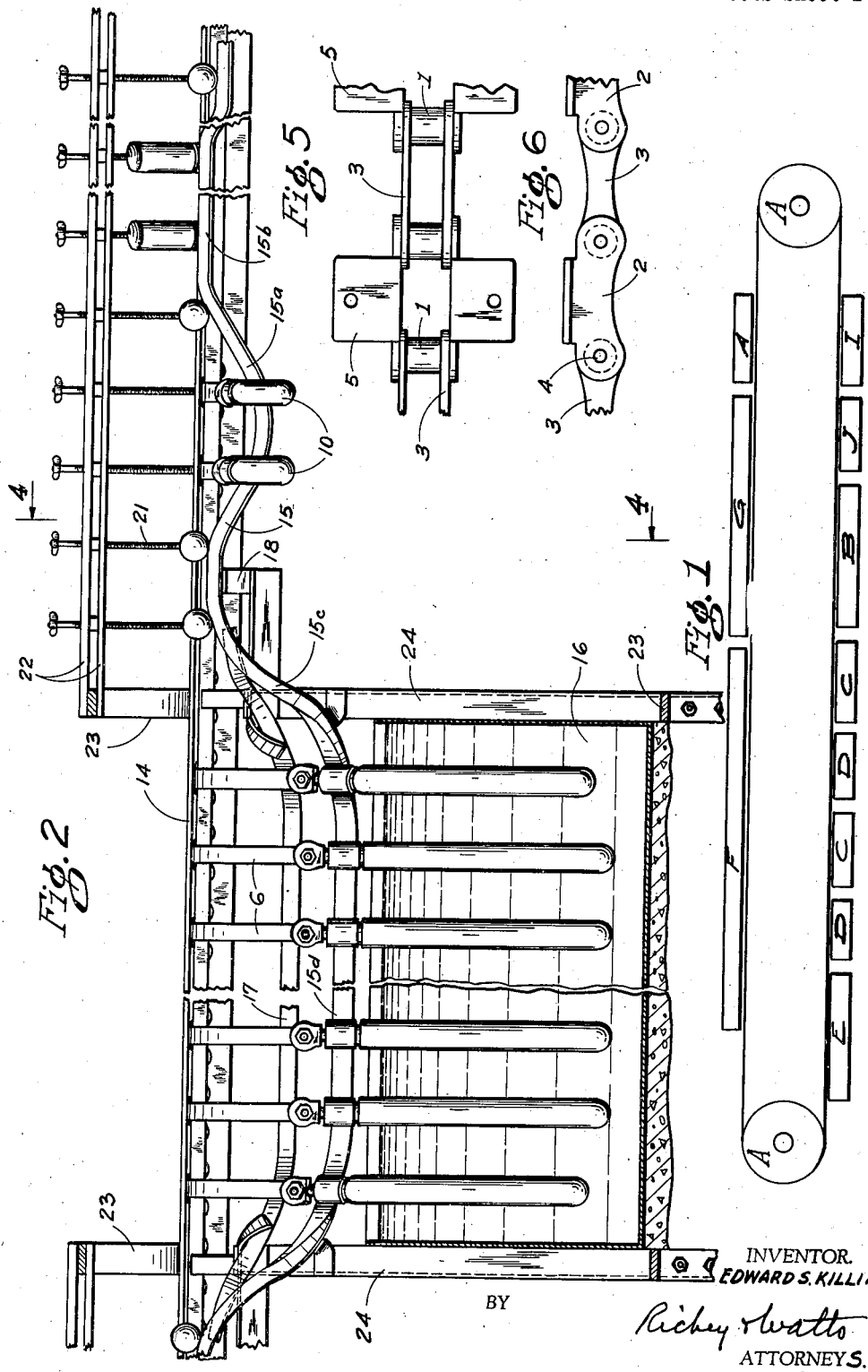
INVENTOR.
EDWARD S. KILLIAN,
BY
Richey Watts
ATTORNEYS.

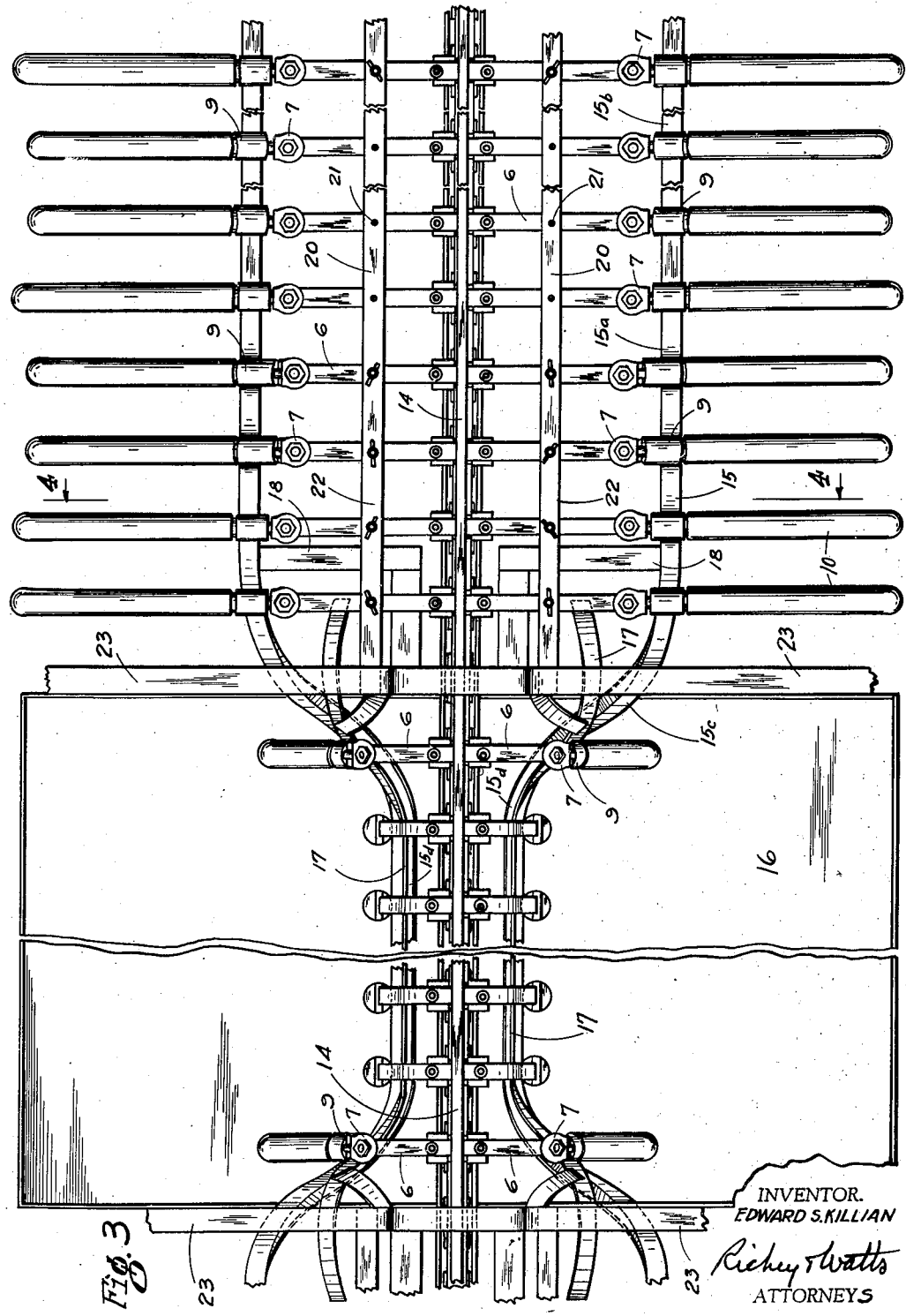

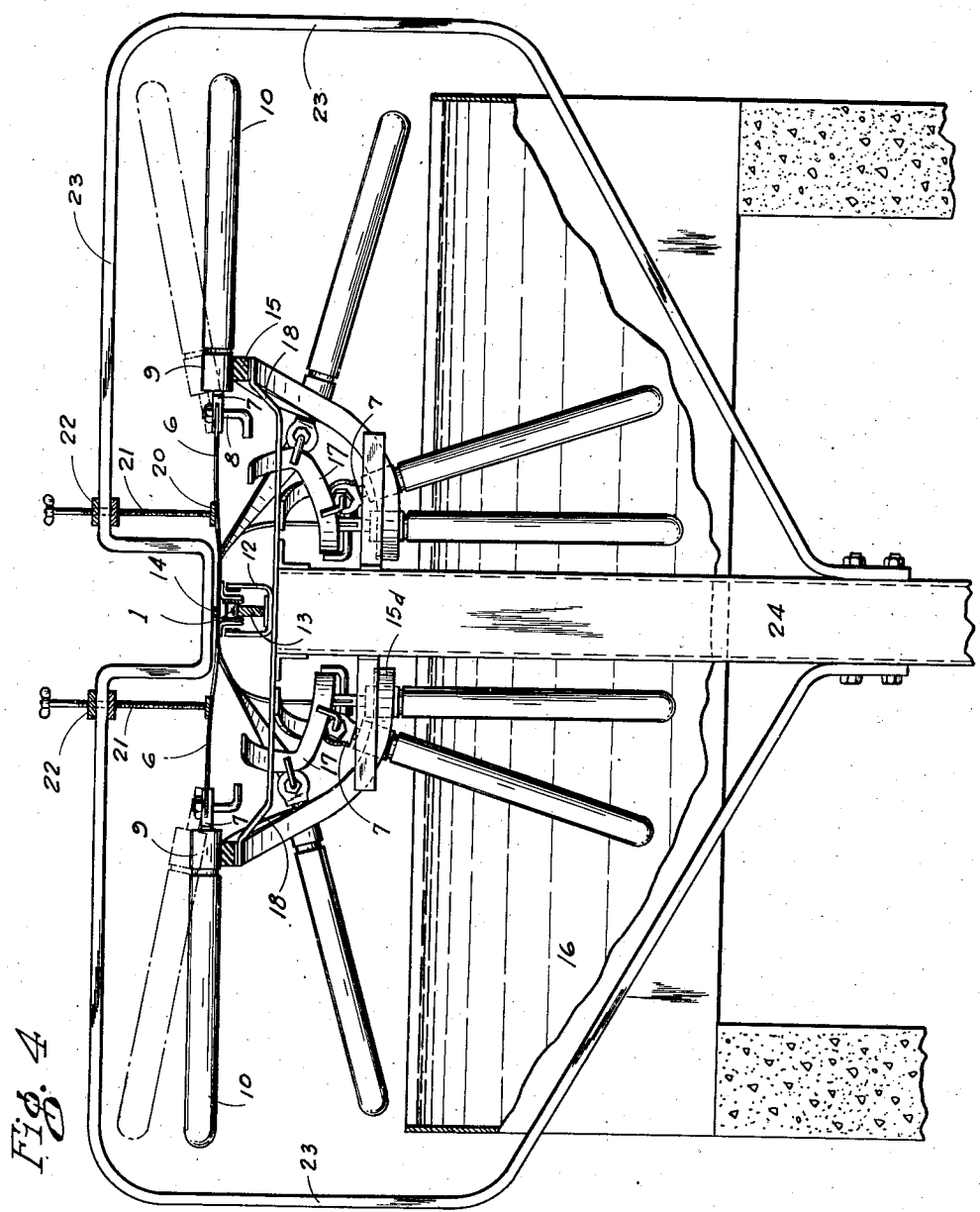

Patented Oct. 28, 1941

2,260,854

UNITED STATES PATENT OFFICE 2,260,854

DIPPING AND DISTRIBUTING APPARATUS

Edward S. Killian, Akron, Ohio, assignor to Frank B. Killian & Company, Akron, Ohio, a partnership composed of Frank B. Killian, James Tyrrell, trustee, and P. H. Stevens Application November 18, 1939, Serial No. 305,099

6 Claims. (Cl. 18—24)

This invention relates to the art of making thin dipped rubber articles and is particularly concerned with apparatus for use in making such articles from rubber solutions or dispersions, particularly latex compounds.

The present invention relates to improvements in apparatus of the general type illustrated in United States Patent No. 2,128,827, issued April 27, 1938, and is directed particularly to new and improved means for attaching dipping forms to an endless conveyor and to new and improved means for controlling the angularity of those forms at different stations along the line of travel of the conveyor.

In the drawings accompanying and forming a part of this specification, and in which one embodiment of the present invention is disclosed, Figure 1 shows diagrammatically a complete automatic machine for making thin dipped articles from rubber solutions or dispersions such as latex compounds;

Figure 2 is a fragmentary side elevational view, partly in section, of the apparatus of Fig. 1, taken at a dipping station;

Figure 3 is a top plan view of the apparatus shown in Figure 2;

Figure 4 is a transverse view, partly in section, taken on lines 4—4 of Fig. 2;

Figures 5 and 6 are, respectively, fragmentary top plan and side elevational views of the endless conveyor.

As is indicated in Fig. 1, an endless conveyor moves along a path defined by wheels A located at each end of the machine, one of which serves to propel the conveyor. As is illustrated in more detail in Figs. 2, 3 and 4, a plurality of forms are attached to this conveyor and these forms are moved past a plurality of stations along the line of travel of the conveyor, including a form-cleaning station B, one or more dipping stations C, one or more drying stations D, a bead rolling station E, a curing station F, a vulcanizing station G, a drying station H, a dusting station I, and a take-off station J. At the form-cleaning station B, the forms are washed and brushed to remove foreign material therefrom. At the dipping station, or stations, C the forms are dipped into a solution or dispersion of rubber, such as a latex compound containing accelerators, vulcanizers and the like. At the drying station, or stations, D the films of rubber on the forms are partially dried and further drying and curing is performed at station F. At station E beads are rolled on the articles on the forms. At station G the films are vulcanized by being dipped into water or other suitable liquid at a vulcanizing temperature, after which the films are dried at station H, dusted at station I and removed from the forms at station J.

In Figs. 2, 3 and 4 the conveyor is shown as consisting of an endless chain 1 composed of links 2 and 3 (see Figs. 5 and 6) alternately connected together by pins 4. Each link 2 has lateral extensions 5 to which are attached thin, bendable, flexible arms 6, which are here shown as being thin strips of spring steel. At the other end of each arm 6 is attached a form mounting 7 which has a bifurcated end to receive the end of the arm 6 and a bent shoulder pin 8 which passes thru the arm 6 and said bifurcated end to hold the two in assembled position. The mounting 7 has a cylindrical part which extends thru a correspondingly shaped axial hole in the plug 9 of form 10. A nut on said pin within form 10 serves to hold the plug 9 and form 10 on the mounting 7 for rotational movement relative thereto.

The conveyor 1 is moved along a U-shaped channel 12 with the projections 5 of the links resting on the top edges of the channel and with the central parts of the links resting on an upstanding member 13 disposed centrally in the U-shaped channel 12. A longitudinally extending member 14 supported above the conveyor bears on the tops of the links of the conveyor 1 and serves to keep the conveyor in its channel.

Stationary rails 15 are disposed along opposite sides of the conveyor 1 to engage with plugs 9 of form 10. As is indicated in Fig. 2, these rails 15 may be depressed at different places, as is illustrated at 15a, and elevated at other places, as is indicated at 15b. Furthermore, these rails 15 are curved downwardly, as at 15c adjacent to the ends of a dipping tank 16. It will be understood that rails 15 extend for substantially the full length of the conveyor, except at stations such as dipping and vulcanizing stations and any other places where the forms are to be dipped into a liquid, and that even at such places the rails 15 may be used if the forms are to be rotated at such places. Portions 15d of rails 15 which are located between the ends of a tank may be used when the forms are to be rotated while they are moving thru liquid in the tank. These portions may be omitted when the forms are not to rotate while in the tank.

Stationary guides 17 are disposed along the travel of the conveyor 1 and extend from a point in front of a dipping tank across the latter to a point beyond its far end. These guides 17 are supported by the cross bars 18 which also support rails 15 and which are themselves supported by the framework of the machine. At the entering side of the tank or tanks 16 guides 17 are disposed to engage over the inturned ends of bent hooks on pins 8, so that as the conveyor moves forwardly and these hooks engage under guides 17 the forms will be pulled downwardly into the tank. These guides 17 are bent inwardly and turned on edge between the ends of the tank so that forms may be pulled down to a vertical or substantially vertical position in the tank. Near the discharge end of tank or tanks 16 the guides 17 are bent outwardly and upwardly so that the forms are returned toward a horizontal position, the guides 17 are then bent inwardly so that the bent hooks of pins 8 move out of engagement with the guides shortly after the plugs 9 engage the upwardly inclined parts 15c of rails 15.

Between dipping tanks 16, and at such other places along the line of travel the conveyor 1 as may be necessary or desirable, slides 20 are disposed to bear on the top surface of spring arm 6. These slides 20 may be carried by adjusting screws 21 supported by one or more plates 22 carried by arms 23 which extend outwardly beyond the ends of forms 10 and downwardly to posts 24 which support the channel 12 and cross bars 18. By adjusting the screws 21 the slides 20 may exert more or less pressure on spring arms 6. When the pressure so exerted is sufficiently high, these arms may be bent down and the forms moved into a position where the closed end of form 10 is above the plug 9, or less pressure may be used where the rails are elevated as at 15b. Where it is desirable that the closed end of form 10 should be below plug 9, the rails 15 may be depressed as shown at 15a and the screws 21 adjusted to permit the spring arms 6 to bend and permit the forms to take the desired position.

From the foregoing description it will be understood that when the conveyor 1 moves a form 10 along a rail 15, the form rotates or rolls on the rail; that when the form reaches a point adjacent the near end of a dipping tank 16 the inwardly bent end of the pin 8 associated with that form will engage under guides 17 and, as the conveyor continues its forward movement, the form 10 will be pulled down into the tank and brought to a vertical or substantially vertical position depending on the disposition of the guide 17; that the form will engage and roll on rail 15d if one is present; that as the form approaches the far end of the tank the upwardly inclined part 15c of rail 15 will lift the form out of the tank after which the inwardly bent hook on pin 8 will slide out from under guides 17 and permit the form to assume a position determined by rail 15 and slide 20.

It will be understood from the foregoing specification that the present invention permits the forwardly traveling forms to be moved into a plurality of different positions without the use of any hinges or the like which may be the source of annoyance, maintenance, expense and may have a tendency to bring foreign material into the solutions in the dipping tanks; and that the present invention affords simple, inexpensive apparatus of new and improved form which does not possess these disadvantages and which constitutes a new combination of elements.

Having thus described the present invention so that others skilled in the art will be able to understand and practice the same, I state that what I desire to secure by Letters Patent is defined in what is claimed.

What is claimed is:

1. Apparatus of the class described comprising an endless conveyor, a flexible member attached at one end thereto and normally projecting laterally therefrom, a form carrier non-rotatably attached to the other end of said member, a form rotatable on said carrier, and means cooperating with said flexible member to flex the latter as it is moved by the conveyor and thereby to vary the angularity of the form.

2. Apparatus of the class described comprising an endless conveyor, a flexible member attached at one end thereto and normally projecting laterally therefrom, a form carrier non-rotatably attached to the other end of said member, a dipping form rotatable on said carrier, and means cooperating with said member to flex it and thereby vary the angularity of the form, said means including a pressure member engaging said carrier between its ends and an abutment engaging said form.

3. Apparatus of the class described comprising an endless conveyor, a flexible member attached thereto and normally projecting therefrom, a form carrier non-rotatably attached to said member, a dipping form rotatable on said carrier, and means for varying the angularity of the form, said means including a fixed guide and a guide follower attached to said flexible member.

4. Apparatus of the class described comprising an endless conveyor, a flexible member secured thereto, a form carrier non-rotatably secured to said member, a form rotatably mounted on said carrier, a rail engageable with the form, a guard, and a guard follower disposed near said form and engageable with said guard, the guard being bent to flex the flexible member and thereby vary the angularity of the form when the conveyor is moved.

5. Apparatus of the class described comprising an endless conveyor, a bendable member secured at one end to said conveyor, a form carrier non-rotatably secured to the other end of said member, a form rotatable on said carrier, a rail engageable with said form, and means engageable with said bendable member between its ends for exerting bending pressure on the latter and pressing said form against said rail.

6. Apparatus of the class described comprising an endless conveyor, means to support said conveyor, flexible arms secured to and normally projecting laterally from said conveyor, form mountings non-rotatably secured to said arms, forms rotatably mounted on said mountings, rails beneath and engageable with said forms, slides disposed above and engageable with said arms between their ends for exerting bending pressure thereon, bent guides below said arms, and guide followers connected to said arms near said forms and engageable with said guides.

EDWARD S. KILLIAN.